(12) United States Patent
Fujinoki

(10) Patent No.: US 7,724,633 B2
(45) Date of Patent: May 25, 2010

(54) ABERRATION CORRECTING APPARATUS, OPTICAL PICKUP, AND ABERRATION CORRECTING METHOD

(75) Inventor: Shinichi Fujinoki, Saitama (JP)

(73) Assignee: Pioneer Corporation, Tokyo (JP)

( * ) Notice: Subject to any disclaimer, the term of this patent is extended or adjusted under 35 U.S.C. 154(b) by 381 days.

(21) Appl. No.: 11/887,208

(22) PCT Filed: Mar. 31, 2006

(86) PCT No.: PCT/JP2006/306844

§ 371 (c)(1),
(2), (4) Date: Dec. 20, 2007

(87) PCT Pub. No.: WO2006/106925

PCT Pub. Date: Oct. 12, 2006

(65) Prior Publication Data

US 2008/0212432 A1    Sep. 4, 2008

(30) Foreign Application Priority Data

Mar. 31, 2005    (JP) ............................. 2005-104881

(51) Int. Cl.
*G11B 7/00* (2006.01)
(52) U.S. Cl. .............................. 369/112.02; 369/53.12

(58) Field of Classification Search ....................... None
See application file for complete search history.

(56) References Cited

U.S. PATENT DOCUMENTS

2002/0191502 A1* 12/2002 Hirai ..................... 369/44.24
2004/0100879 A1*  5/2004 Ogasawara ............. 369/44.32
2004/0125734 A1*  7/2004 Iwasaki et al. ......... 369/112.02

FOREIGN PATENT DOCUMENTS

| JP | 2000-040249 | 2/2000 |
|----|-------------|--------|
| JP | 2001-084631 | 3/2001 |
| JP | 2003-173562 | 6/2003 |
| JP | 2005-071424 | 3/2005 |
| JP | 2006-092708 | 4/2006 |

OTHER PUBLICATIONS

PCT International Search Report mailed Apr. 25, 2006.

* cited by examiner

*Primary Examiner*—Paul Huber
(74) *Attorney, Agent, or Firm*—Nixon & Vanderhye P.C.

(57) ABSTRACT

An optical pickup to be used for both DVD and CD is provided with an aberration correcting device using liquid crystal on an input side of an objective lens. A spherical aberration of a CD is corrected by using an electrode for DVD spherical aberration correction and electrodes for DVD astigmatism correction.

9 Claims, 5 Drawing Sheets

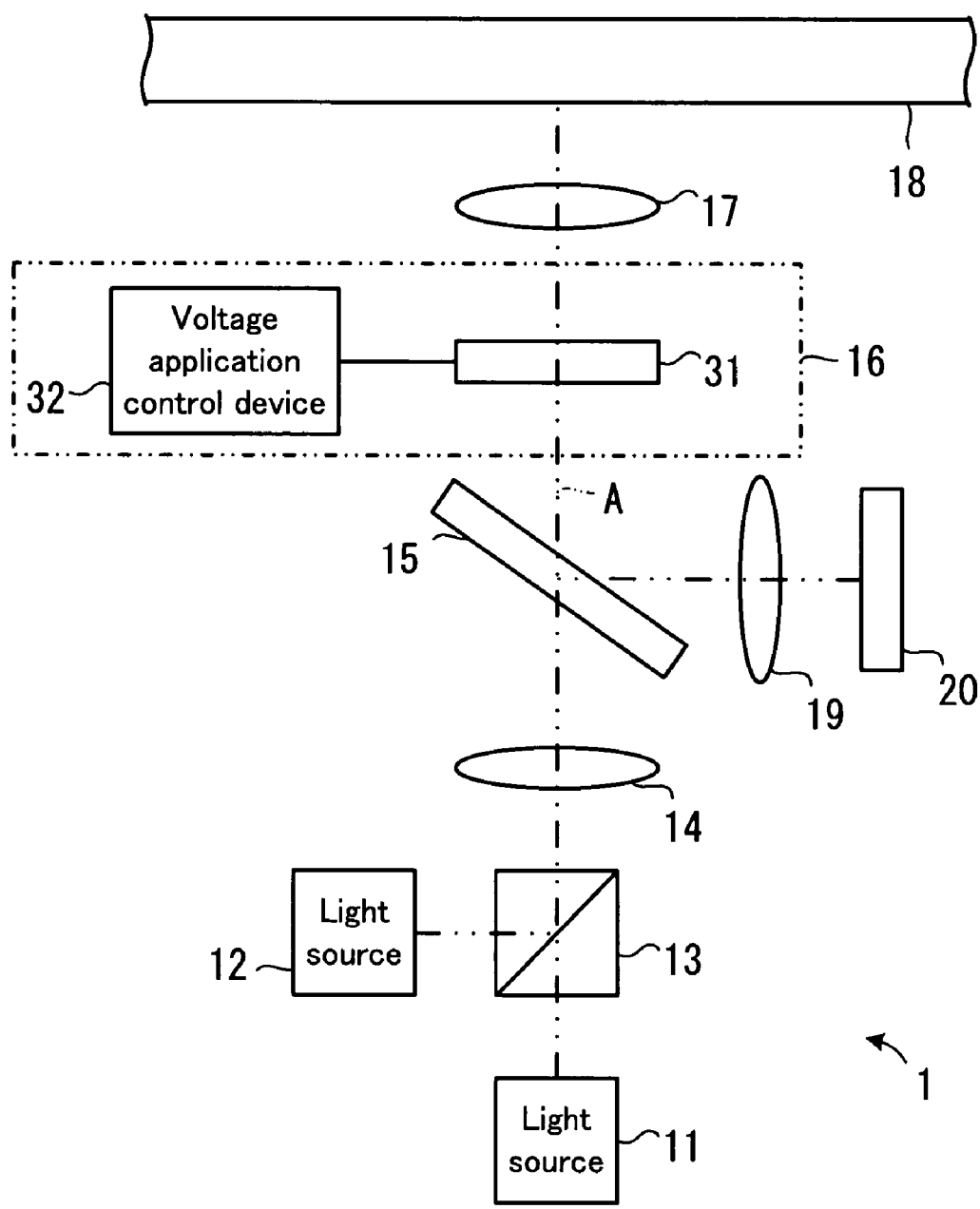
[FIG. 1]

[FIG. 2]
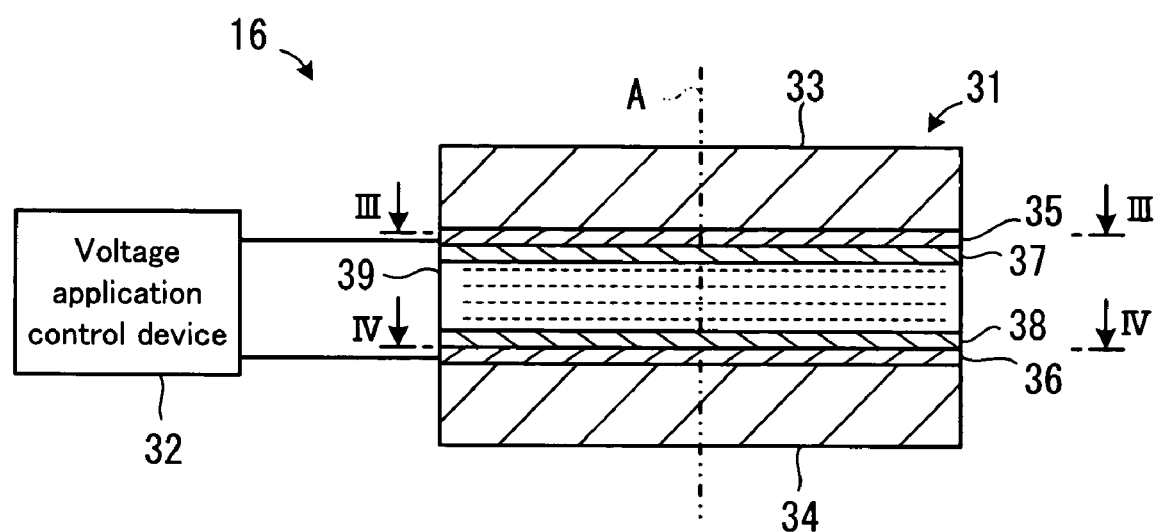

[FIG. 3]
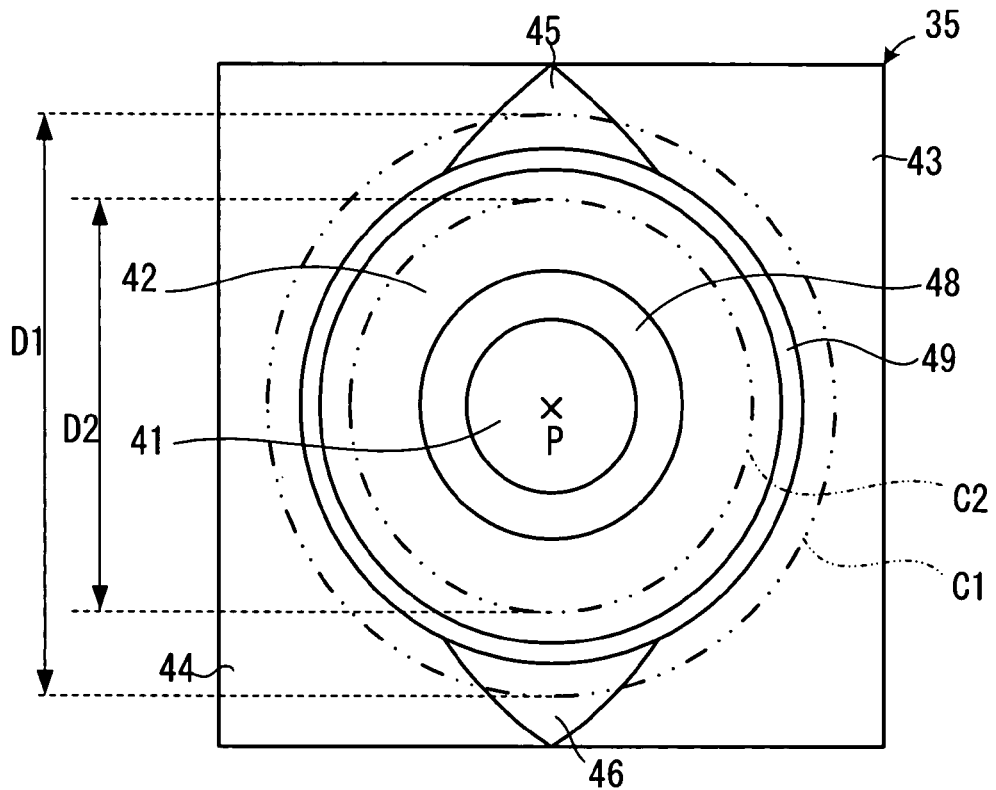
[FIG. 4]
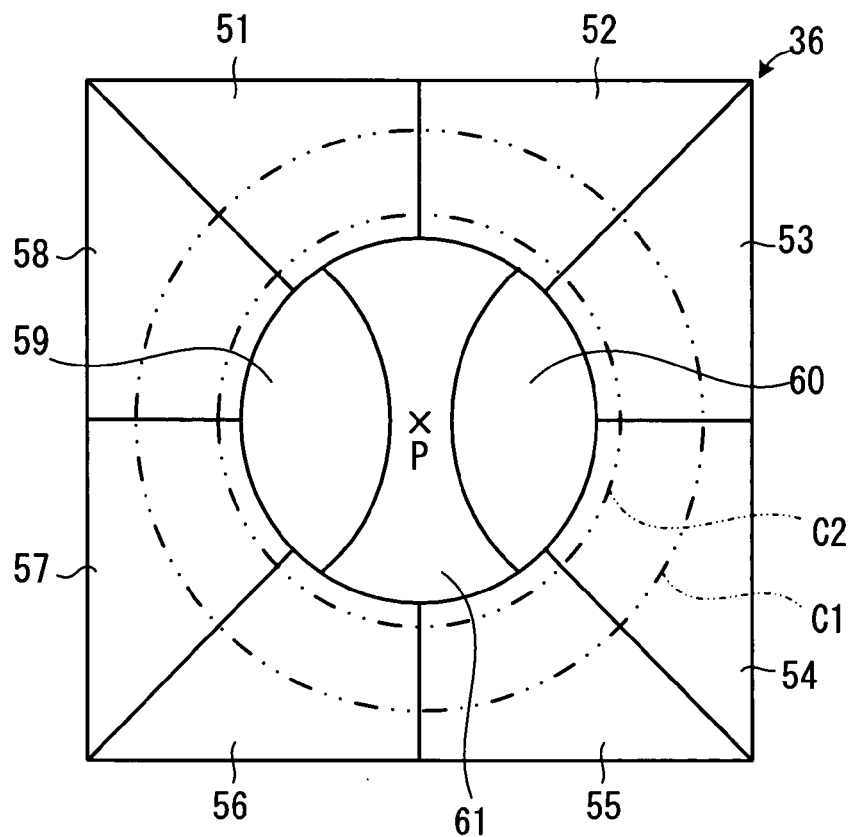

[FIG. 5]
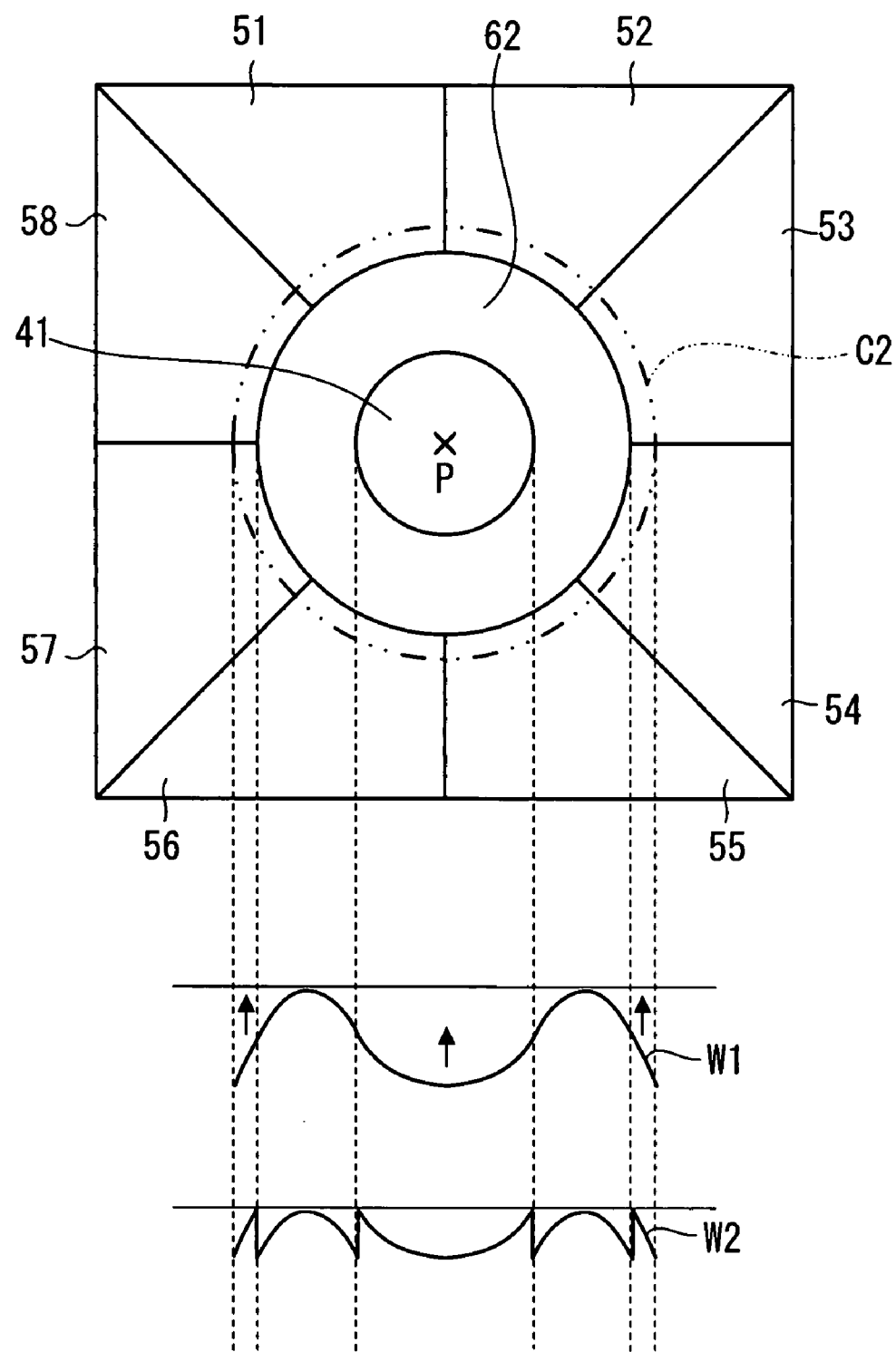

[FIG. 6]
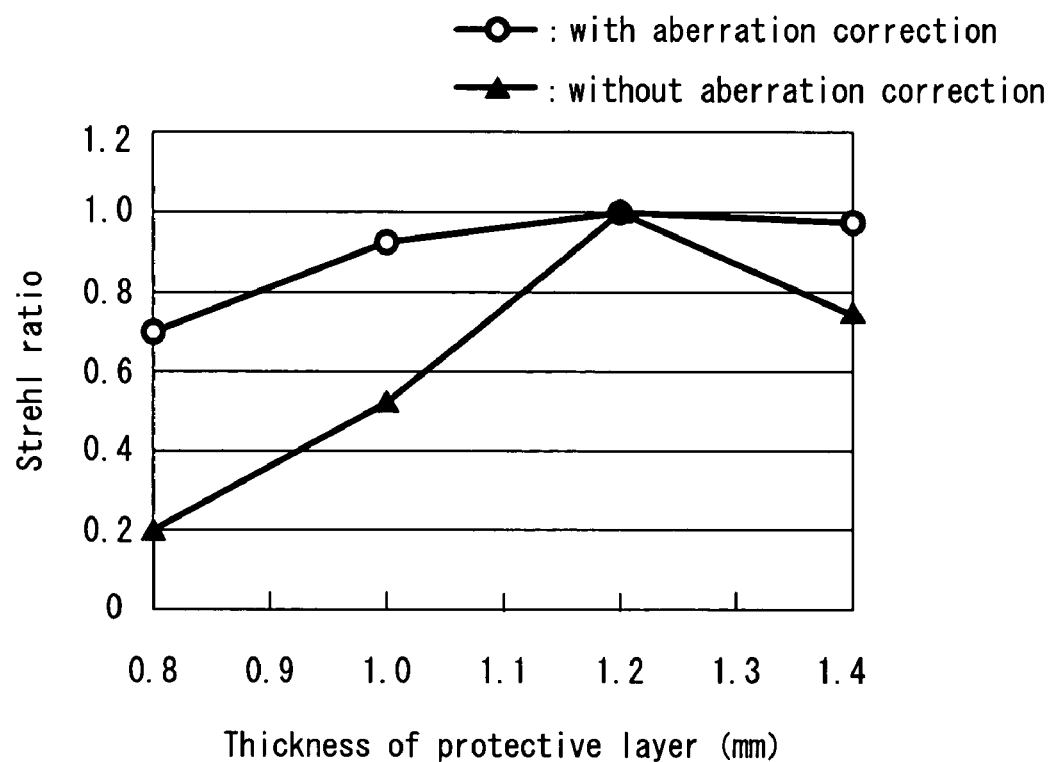

ABERRATION CORRECTING APPARATUS, OPTICAL PICKUP, AND ABERRATION CORRECTING METHOD

TECHNICAL FIELD

The present invention relates to an aberration correcting apparatus which is used for an optical pickup for information recording or reading with respect to e.g. an optical disc, an optical pickup provided with the aberration correcting apparatus, and an aberration correcting method on the aberration correcting apparatus.

BACKGROUND ART

There has been spread of various types of optical discs, such as a DVD and a CD (Compact Disc). Moreover, there has been spread of a disc drive which is integrally provided with a function for information recording or reading with respect to a plurality types of optical discs. Such a disc drive is referred to as a multidisc drive or a multi drive. As an optical pickup of this type of disc drive, an optical disc having such a structure that it can be shared among a plurality of optical discs is sometimes used. One of these optical pickups is an optical disc for DVD/CD. This optical pickup is provided with a light source which outputs a light beam for information recording or reading with respect to a DVD and a light source which outputs a light beam for information recording or reading with respect to a CD. This optical pickup also unifies these light beams on a single optical axis and focuses it on the recording surface of the DVD or the recording surface of the CD by using a single objective lens.

By the way, the DVD has a higher recording density than that of the CD. In order to ensure stability or accuracy in the information recording or reading with respect to the DVD, it is desirable to provide the optical pickup with a mechanism for correcting spherical aberration, coma aberration, and astigmatism aberration. Some of the optical pickups for DVD/CD which are currently popular are provided with an aberration correcting apparatus which uses a liquid crystal (LC) to correct the spherical aberration, the coma aberration, and the astigmatism aberration with regard to the DVD. The aberration correcting apparatus is provided, for example, with a LC optical element and a LC driver for driving the LC optical element. The LC optical element is normally located on the incident side of the objective lens and is disposed to cross the optical axis. The LC optical element has two electrode layers which are arranged to face each other with the LC therebetween. Each of the electrode layers has a transparent electrode pattern formed to correct the spherical aberration, the coma aberration, and the astigmatism aberration with regard to the DVD. When correcting the aberration, it applies voltages to electrodes, changes LC orientation, and changes LC refractive index. By this, an optical path length (or phase) of the light beam which passes through the LC is changed, to thereby uniform the wavefront of the light beam for DVD and correct the aberration.

On the other hand, the CD has a lower recording density than that of the DVD. Moreover, a signal processing technique about the information recording or reading with respect to the CD is sufficiently mature. From such situations, it has been generally considered that it is only necessary to correct the coma aberration on the optical pickup, with regard to the CD. In fact, the aberration correcting apparatus provided for the optical pickups for DVD/CD which are currently popular has a function for correcting only the coma aberration with regard to the CD although it has a function for correcting the spherical aberration, the coma aberration, and the astigmatism aberration with regard to the DVD.

DISCLOSURE OF INVENTION

Subject to be Solved by the Invention

Even in the case of the CD, however, if the thickness of a protective layer, which is located on the incident side of the light beam, varies considerably, it is impossible to neglect the spherical aberration caused by the variable thickness. That is, even if the thickness of the protective layer varies considerably, it is desirable to correct the spherical aberration with regard to the CD in order to sufficiently ensure the stability or accuracy in the information recording or reading. Thus, it is desired to add a function of correcting the spherical aberration with regard to the CD, to the aberration correcting apparatus provided for the optical pickup for DVD/CD.

However, there are the following problems with regard to adding the function of correcting the spherical aberration with regard to the CD, to the aberration correcting apparatus. That is, in order to add the function of correcting the spherical aberration with regard to the CD, to the aberration correcting apparatus, it is necessary to newly form an electrode pattern for correcting the spherical aberration with regard to the CD, in the electrode layer of the LC optical element. However, in the electrode layer of the LC optical element, which is provided for the optical pickup for DVD/CD, the electrode patterns for correcting the spherical aberration and the like with regard to the DVD are already formed. Thus, the addition of the new electrode pattern to the electrode layer makes the electrode pattern complicated and increases the number of electrode dividing lines, i.e. boundary lines (or gap) between the electrode patterns. The increase in the number of dividing lines increases diffraction light, which is caused by that the light beam passes through the dividing lines. By this, the light beam cannot be efficiently focused, and the intensity of the light beam is reduced on the recording surface of the disc. Moreover, the diffraction light enters a light receiving surface of a photodetector, which is to convert reflected light from the disc to an electrical signal, as stray light, which reduces the accuracy of detecting the reflected light and which possibly deteriorates reproduction quality (or playability) of the optical disc.

These problems may occur not only if the aberration correcting apparatus is used for the optical pickup for DVD/CD but also if the aberration correcting apparatus is used for another optical pickup which has such a structure that it can be used for a plurality of types of optical discs.

In view of the aforementioned problems, it is therefore a first object of the present invention to provide an aberration correcting apparatus, an optical pickup and an aberration correcting method, which can correct the spherical aberration with regard to a plurality of types of optical discs while ensuring the sufficient intensity of the light beam.

It is a second object of the present invention to provide an aberration correcting apparatus, an optical pickup and an aberration correcting method, which can correct the spherical aberration with regard to the plurality of optical discs while ensuring the sufficient accuracy of detecting the reflected light on the photodetector.

It is a third object of the present invention to provide an aberration correcting apparatus, an optical pickup and an aberration correcting method, which can correct the spherical aberration with regard to the plurality of optical discs without increasing the number of electrode patterns or dividing lines in the electrode layer.

Means for Solving the Subject

The above object of the present invention can be achieved by an aberration correcting apparatus used for an optical pickup which can focus a first light beam for a first optical disc on the first optical disc and a second light beam for a second optical disc on the second optical disc by using an objective lens, the aberration correcting apparatus provided with: a liquid crystal optical element which is disposed to cross a unified optical axis and which is provided with a liquid crystal, the unified optical axis being obtained by matching an optical axis of the first light beam with an optical axis of the second light beam; two electrode layers which are provided for the liquid crystal optical element and which face each other with the liquid crystal therebetween; a first electrode which is formed in any one of the electrode layers and which is located on a point P if it is assumed that each of the electrode layers and the unified optical axis cross at the point P, if it is assumed that a circle whose central point is the point P and whose diameter is substantially equal to an effective diameter D1 associated with the first optical disc is a circle C1, and if it is assumed that a circle whose central point is the point P and whose diameter is substantially equal to an effective diameter D2 (D2<D1) associated with the second optical disc is a circle C2; a plurality of second electrodes which are formed in any one of the two electrodes and which is located so as to surround the first electrode; a plurality of third electrodes which are formed in any one of the two electrodes, which partially overlap a circumference of the circle C1 and a circumference of the circle C2, and which are arranged along the circumference of the circle C1 and the circumference of the circle C2; a non-application area which is located between the first electrode and the third electrodes when each of the electrode layers, which are superimposed, is observed in the unified optical axis, which is substantially annular, and which does not change a state of voltage application to the liquid crystal depending on voltage application to the first electrode and the third electrodes; a first voltage application controlling device for controlling voltage application to the first electrode and the second electrodes in order to correct spherical aberration with regard to the first optical disc; a second voltage application controlling device for controlling the voltage application to the third electrodes in order to correct astigmatism aberration with regard to the first optical disc; and a third voltage application controlling device for controlling voltage application to the first electrode and the third electrodes in order to correct spherical aberration with regard to the second optical disc.

The above object of the present invention can be also achieved by an optical pickup provided with the aberration correcting apparatus of the present invention (including its various aspects).

The above object of the present invention can be also achieved by a correction method of correcting spherical aberration with regard to a second optical disc on an aberration correcting apparatus used for an optical pickup which can focus a first light beam for a first optical disc on the first optical disc and a second light beam for the second optical disc on the second optical disc by using an objective lens, the aberration correcting apparatus provided with: (a) a liquid crystal optical element which is disposed to cross a unified optical axis and which is provided with a liquid crystal, the unified optical axis being obtained by matching an optical axis of the first light beam with an optical axis of the second light beam; (b) two electrode layers which are provided for the liquid crystal optical element and which face each other with the liquid crystal therebetween; (c) a first electrode which is formed in any one of the electrode layers and which is located on a point P if it is assumed that each of the electrode layers and the unified optical axis cross at the point P, if it is assumed that a circle whose central point is the point P and whose diameter is substantially equal to an effective diameter D1 associated with the first optical disc is a circle C1, and if it is assumed that a circle whose central point is the point P and whose diameter is substantially equal to an effective diameter D2 (D2<D1) associated with the second optical disc is a circle C2; (d) a plurality of second electrodes which are formed in any one of the two electrodes and which is located so as to surround the first electrode; (e) a plurality of third electrodes which are formed in any one of the two electrodes, which partially overlap a circumference of the circle C1 and a circumference of the circle C2, and which are arranged along the circumference of the circle C1 and the circumference of the circle C2; and (f) a non-application area which is located between the first electrode and the third electrodes when each of the electrode layers, which are superimposed, is observed in the unified optical axis, which is substantially annular, and which does not change a state of voltage application to the liquid crystal, depending on voltage application to the first electrode and the third electrodes, the method provided with: a first voltage applying process of applying a voltage to the first electrode so as to substantially match wavefront of the second light beam corresponding to the first electrode with wavefront of the second light beam corresponding to the non-application area; and a second voltage applying process of applying voltages to the third electrodes so as to substantially match wavefront of the second light beam corresponding to the third electrodes with wavefront of the second light beam corresponding to the non-application area.

These effects and other advantages of the present invention will become more apparent from the embodiments explained below.

BRIEF DESCRIPTION OF DRAWINGS

FIG. 1 is an explanatory diagram showing an embodiment of the optical pickup in the present invention.

FIG. 2 is an explanatory diagram showing an embodiment of the aberration correcting apparatus in the present invention.

FIG. 3 is a plan view showing a first electrode layer of a liquid crystal (LC) element observed in an arrow III-III direction in FIG. 2.

FIG. 4 is a plan view showing a second electrode layer of the LC element observed in an arrow IV-IV direction in FIG. 2.

FIG. 5 is a plan view showing only electrodes which are used for the correction of sphere aberration with regard to a CD, wherein the first electrode layer observed in the arrow III-III direction in FIG. 3 and the second electrode layer observed in the arrow IV-IV direction in FIG. 3 are superimposed.

FIG. 6 is a graph showing a relationship between the thickness of a protective layer of the CD and a Strehl ratio when the spherical aberration is corrected with regard to the CD and when it is not corrected, by the aberration correcting apparatus in the present invention.

DESCRIPTION OF REFERENCE CODES

1 optical pickup
16 aberration correcting apparatus
18 optical disc 31 liquid crystal optical element
32 voltage application control device (first to fourth voltage application controlling devices)
35, 36 electrode layer
39 liquid crystal
41 first electrode
42 to 46 second electrode
51 to 58 third electrode
A unified optical axis

BEST MODE FOR CARRYING OUT THE INVENTION

Hereinafter, the best mode for carrying out the present invention will be explained in each embodiment in order with reference to the drawings.

An aberration correcting apparatus in an embodiment of the present invention can be used for e.g. an optical pickup for DVD/CD. FIG. 1 shows the structure of the optical pickup for DVD/CD. As shown in FIG. 1, an optical pickup 1 switches between a light beam for DVD and a light beam for CD, to thereby focus the light beam for DVD on a DVD and the light beam for CD on a CD by using one objective lens 17 and perform information recording and reading on the DVD and the CD.

That is, when the information recording or reading is performed on the DVD, for example, a light beam with a wavelength of 660 nm is outputted from a semiconductor laser light source 11 for DVD. The light beam passes through a dichroic prism 13 and enters a collimator lens 14. Then, the light beam for DVD is converted to parallel light by the collimator lens 14, and it passes through a half mirror 15 and travels along a unified optical axis A. Then, the light beam for DVD enters a LC optical element 31 of an aberration correcting apparatus 16. The aberration correcting apparatus 16 corrects spherical aberration, coma aberration, and astigmatism aberration with regard to the light beam for DVD. The light beam for DVD in which the aberrations are corrected is focused on a recording surface of an optical disc 18 (DVD) by the objective lens 17. Then, the light beam is reflected by the recording surface of the optical disc 18. The reflected light passes through the objective lens 17 and the LC optical element 31 and enters the half mirror 15. Then, the reflected light is turned around by the half mirror 15 and is focused on a light receiving surface of a light receiving element 20 by a condenser lens 19.

On the other hand, when the information recording or reading is performed on the CD, for example, a light beam with a wavelength of 780 nm is outputted from a semiconductor laser light source 12 for CD. The light beam is turned around by the dichroic prism 13 and enters the collimator lens 14. Then, the light beam for CD is converted to parallel light by the collimator lens 14, and it passes through the half mirror 15 and travels along the unified optical axis A. Then, the light beam for CD enters the LC optical element 31 of the aberration correcting apparatus 16. The aberration correcting apparatus 16 corrects the spherical aberration and the coma aberration with regard to the light beam for CD. The light beam for CD in which the aberrations are corrected is focused on the recording surface of the optical disc 18 (CD) by the objective lens 17. Then, the light beam is reflected by the recording surface of the optical disc 18. The reflected light follows the same route as that of the reflected light of the light beam for DVD and reaches to the light receiving surface of the light receiving element 20.

FIG. 2 shows the structure of the aberration correcting apparatus 16 in FIG. 1, namely, the aberration correcting apparatus in the embodiment of the present invention.

The aberration correcting apparatus 16, as shown in FIG. 2, is provided with: the LC optical element 31; and a voltage application control device 32.

The LC optical element 31, as shown in FIG. 1, is disposed to cross the unified optical axis A, which is obtained by matching an optical axis of the light beam for DVD with an optical axis of the light beam for CD, in the optical pickup 1. The LC optical element 31 is provided with: substrates 33 and 34; electrode layers 35 and 36; oriented films 37 and 38; and a LC 39, as shown in FIG. 2. The substrates 33 and 34 are transparent flat plates and are formed of a glass material, for example. The electrode layers 35 and 36 are formed on the inner surfaces of the substrates 33 and 34, respectively. The electrode layers 35 and 36 cross the unified optical axis A and face each other with the LC 39 therebetween. The electrode layers 35 and 36 are transparent thin films and are formed of ITO (Indium Tin Oxide) or the like. Moreover, the electrode layers 35 and 36 have a plurality of electrodes formed therein. The oriented films 37 and 38 are thin films which provide predetermined molecular orientation for the LC 39. The LC 39 is a material which is characterized in that the molecular orientation is changed by applying a voltage. That is, if voltages are applied to the electrodes, which are formed in the electrode layers 35 and 36, to thereby apply a voltage to the LC 39, the voltage application changes the orientation of LC molecules and the refractive index of the LC 39. This allows a partial change in the optical path length (or phase) of the light beam which passes through the LC 39, and this also uniforms the wavefront of the light beam.

The voltage application control device 32 controls voltage application to each of the plurality of electrodes formed in the electrode layers 35 and 36. The voltage application control device 32 is electrically connected to the respective electrodes formed in the electrode layers 35 and 36. The voltage application control device 32 is provided with a voltage generation circuit for generating an application voltage, a microcomputer for controlling the voltage generation circuit, or the like. Incidentally, the voltage application control device 32 is a specific example of the first to fourth voltage application controlling devices.

FIG. 3 is a view showing the LC optical element 31 observed in an arrow III-III direction in FIG. 2 and shows an electrode pattern formed in the electrode layer 35. In FIG. 3, it is assumed that the electrode layer 35 and the unified optical axis A cross at a point P. It is also assumed that a circle whose central point is the point P and whose diameter is substantially equal to an effective diameter D1 associated with the DVD is a circle C1. It is also assumed that a circle whose central point is the point P and whose diameter is substantially equal to an effective diameter D2 (D2<D1) associated with the CD is a circle C2.

As shown in FIG. 3, the electrode layer 35 has transparent electrodes 41, 42, 43, 44, 45, and 46 formed therein. These electrodes are electrically insulated from each other and can control the voltage application independently. The electrode 41 is circular, is located on the inner side of the circle C1 and the circle C2, and is also disposed on the point P. The electrode 42 is annular, is located on the inner side of the circle C1, and is disposed concentrically to the electrode 41 so as to surround the electrode 41. The electrodes 43, 44, 45, and 46 are substantially annular if the electrodes are observed as a unified electrode group. The electrodes 43, 44, 45, and 46 overlap the circumference of the circle C1 and are disposed concentrically to the electrodes 41 and 42 so as to surround the electrode 42. The electrodes 43 and 44 are shaped and arranged to be substantially symmetric with respect to the point P. Between the electrode 41 and the electrode 42, there is formed a transparent annular gap 48. Between the electrode 42 and the electrode group which consists of the electrodes 43, 44, 45, and 46, there is formed a transparent annular gap 49. A voltage is not applied to the annular gaps 48 and 49, or a voltage is always applied thereto in a certain polarity and to a certain extent. Incidentally, the electrode 41 is a specific example of the first electrode, and the electrodes 42 to 46 are a specific example of the second electrode.

FIG. 4 is a view showing the LC optical element 31 observed in an arrow IV-IV direction in FIG. 2 and shows an electrode pattern formed in the electrode layer 36. In FIG. 4, as in FIG. 3, it is assumed that the electrode layer 36 and the unified optical axis A cross at a point P. It is also assumed that a circle whose central point is the point P and whose diameter is substantially equal to an effective diameter D1 associated with the DVD is a circle C1. It is also assumed that a circle whose central point is the point P and whose diameter is substantially equal to an effective diameter D2 associated with the CD is a circle C2.

As shown in FIG. 4, the electrode layer 36 has transparent electrodes 51, 52, 53, 54, 55, 56, 57, 58, 59, and 60 formed therein. These electrodes are electrically insulated from each other and can control the voltage application independently. The electrodes 51 to 58 partially overlap the circumference of the circle C1 and the circumference of the circle C2, and the electrodes are also arranged along the circumference of the circle C1 and the circumference of the circle C2. The electrodes 51 to 58 exist on the outer circumferential side of the electrode layer 34 and do not exist on the inner circumferential side of the electrode layer 34. The electrodes 59 and 60 are disposed on the inner side of the circle C1 and on the inner circumferential side of the electrode layer 36. The electrodes 59 and 60 are shaped and arranged to be substantially symmetric with respect to the point P. The electrode layer 36 has a transparent space area 61 formed on the center thereof. A voltage is not applied to the space area 61, or a voltage is always applied thereto in a certain polarity and to a certain extent. Incidentally, the electrodes 51 to 58 are a specific example of the third electrode.

The aberration correcting apparatus 16 can correct the spherical aberration, the coma aberration, and the astigmatism aberration with regard to the DVD, and it can correct the spherical aberration and the coma aberration with regard to the CD. The operation of correcting the spherical aberration, the coma aberration, and the astigmatism aberration with regard to the DVD and correcting the coma aberration with regard to the CD on the aberration correcting apparatus 16 is as follows. Firstly, when the spherical aberration regarding the DVD is corrected, the voltage application control device 32 applies the voltages that have the same polarity and the same extent, to the electrodes 48 and 49 formed in the electrode layer 35, and controls the voltage application to the electrode 41, the electrode 42, and the electrode group which consists of the electrodes 43 to 46. At this time, the voltage application control device 32 applies the voltages that have the same polarity and the same extent, to the electrodes 43 to 46. Next, when the coma aberration regarding the DVD is corrected, the voltage application control device 32 controls the voltage application to the electrodes 43 and 44, which are formed in the electrode layer 35, and the electrodes 59 and 60, which are formed in the electrode layer 36. Next, when the astigmatism aberration regarding the DVD is corrected, the voltage application control device 32 controls the voltage application to the electrodes 51 to 58, which are formed in the electrode layer 36. Next, when the coma aberration regarding the CD is corrected, the voltage application control device 32 controls the voltage application to the electrodes 59 and 60.

FIG. 5 shows the operation of correcting the spherical aberration with regard to the CD, on the aberration correcting apparatus 16. FIG. 5 shows such a state that the electrode layer 35 observed in the arrow III-III direction (or the unified optical axis A direction) in FIG. 3 and the electrode layer 36 observed in the arrow IV-IV direction (or the unified optical axis A direction) in FIG. 3 are superimposed. Moreover, FIG. 5 shows only the electrodes 41 and 51 to 58, which are used to correct the spherical aberration with regard to the CD, and omits other electrodes.

When the spherical aberration regarding the CD is corrected, the electrode 41, which is formed in the electrode layer 35, and the electrode group which consists of the electrodes 51 to 58, which are formed in the electrode layer 36, are used. As shown in FIG. 5, the electrode 41 is disposed on the inner side of the circle C2 and is also disposed on the point P. The electrode group which consists of the electrodes 51 to 58 overlaps the circumference of the circle C2. Moreover, between the electrode 41 and the electrode group which consists of the electrodes 51 to 58, there is formed a non-application area 62. The non-application area 62 is substantially annular, and does not cause the voltage application to the LC 39, depending on the voltage application to the electrode 41 and the electrode group which consists of the electrodes 51 to 58.

When the spherical aberration regarding the CD is corrected, the voltage application control device 32 controls the voltage application to the electrode 41 and the electrode group which consists of the electrodes 51 to 58. At this time, the voltage application control device 32 applies the voltages that have the same polarity and the same extent, to the electrodes 51 to 58.

Moreover, when the spherical aberration regarding the CD is corrected, the voltage application control device 32 controls the application voltage to the electrode 41 and the electrode group which consists of the electrodes 51 to 58 so as to substantially match the wavefront of the light beam corresponding to the electrode 41 and the wavefront of the light beam corresponding to the electrode group which consists of the electrodes 51 to 58 with the wavefront of the light beam corresponding to the non-application area 62. That is, the electrode 41 corresponds to the central portion of the light beam. The electrode group which consists of the electrodes 51 to 58 corresponds to the outer circumferential portion of the light beam. The non-application area 62 corresponds to an intermediate annular portion which is located between the central portion and the outer circumferential portion of the light beam. Since the voltage application control device 32 controls the voltage application only to the electrode 41 and the electrode group which consists of the electrodes 51 to 58, no voltage is applied to the non-application area 62, or the voltages that have the same polarity and the same extent are maintained. As a result, the wavefront in the intermediate annular portion of the light beam is not changed. On the other hand, by that voltage application control device 32 controls the voltage application only to the electrode 41 and the electrode group which consists of the electrodes 51 to 58, the wavefront in the central portion of the light beam and the wavefront in the outer circumferential portion are changed so as to substantially match the wavefront in the intermediate annular portion of the light beam.

Here, a wavefront W1 in FIG. 5 shows such a state that the spherical aberration occurs in the light beam for CD. On the other hand, a wavefront W2 in FIG. 5 shows such a state that the wavefronts of the light beam for CD are substantially matched because of the voltage application to the electrode 41 and the electrode group which consists of the electrodes 51 to 58. That is, by virtue of the voltage application to the electrode 41 and the electrode group which consists of the electrodes 51 to 58, it is possible to change the wavefront W1 of the light beam for CD to the wavefront W2, and it is possible to correct the spherical aberration in the light beam for CD.

As explained above, according to the aberration correcting apparatus 16, the spherical aberration regarding the CD can be corrected by virtue of the electrode 41, which is used for the spherical aberration correction regarding the DVD, and the electrodes 51 to 58, which are used for the astigmatism aberration correction regarding the DVD. In other words, it is unnecessary to form an electrode only for the spherical aberration correction regarding the CD. By this, it is possible to prevent the increase in the number of electrodes and the complicated electrode pattern. It is also possible to prevent the increase in the number of electrode dividing lines, i.e. boundary lines (or gap) between the electrode patterns. Therefore, it is possible to inhibit the diffraction light caused by the light beam passing through the dividing lines. As a result, the light beam can be efficiently focused, and the sufficient intensity of the light beam can be ensured. Moreover, it is also possible to inhibit the diffraction light from entering the light receiving surface of the photodetector, which is to convert reflected light from the disc to an electrical signal, as stray light. Thus, it is possible to ensure the sufficient accuracy of detecting the reflected light and to realize good reproduction quality (or playability) of the optical disc. Moreover, since it is possible to prevent the complicated electrode pattern, it is possible to prevent the LC optical element 31 from growing in size.

As described above, according to the aberration correcting apparatus 16, it is possible to realize the spherical aberration correction not only for the DVD but also for the CD while ensuring the sufficient intensity of the light beam and while ensuring the sufficient accuracy of detecting the reflected light on the photodetector. Thus, even if the thickness of the protective layer of the CD varies considerably (e.g. the thickness of the protective layer of the CD is 0.9 mm), it is possible to maintain good reproduction characteristics of the CD, and it is also possible to realize such excellent properties without damaging good reproduction characteristics of the DVD.

FIG. 6 shows a relationship between the thickness of the protective layer of the CD and a Strehl ratio when the spherical aberration is corrected and when it is not corrected with regard to the CD, by the aberration correcting apparatus 16. A value in the thickness of the protective layer of the CD is 1.2 mm on the standard. As shown in FIG. 6, if the thickness is the CD is 1.2 mm, the Strehl ratio is 1.0 with and without the correction. However, if the thickness is the CD is 1.0 mm, the Strehl ratio is about 0.5 without the correction, while the Strehl ratio is about 0.9 with the correction. This means that the spherical aberration correction regarding the CD can be sufficiently realized by the aberration correcting apparatus 16.

Incidentally, as the electrodes used to correct the spherical aberration with regard to the DVD (i.e. the first electrode and the second electrode), the electrodes 41 to 46 in FIG. 3 are listed as an example. However, the shape, the number, the division number, and the arrangement of the electrodes are not limited to those. For example, there may be formed three or more electrodes (or second electrodes) which are substantially annular and which are concentrically arranged to surround the electrode 41 in FIG. 3. Moreover, there is also no limitation on the shape, the number, the division number, and the arrangement of the electrodes used to correct the coma aberration regarding the DVD and the CD. Moreover, there is also no limitation on the shape, the number, the division number, and the arrangement of the electrodes used to correct the astigmatism aberration regarding the DVD. Moreover, the outer shape of the LC optical element is not necessarily quadrangular but may be in another shape, such as circular.

Moreover, in FIG. 3 and FIG. 4, the electrodes used to correct the spherical aberration with regard to the DVD are formed in the electrode layer 35, the electrodes used to correct the astigmatism aberration with regard to the DVD are formed in the electrode layer 36, and the electrodes used to correct the coma aberration with regard to the DVD and the CD are distributed and formed in the electrode layers 35 and 36. However, such an arrangement relationship between the electrodes and the electrode layer is merely one example and is not limited to this.

Moreover, the aberration correcting apparatus of the present invention is not limited to the optical pickup for DVD/CD and can be also applied to another optical pickup which has such a structure that it can be shared among a plurality of optical discs.

In the present invention, various changes may be made without departing from the essence or spirit of the invention which can be read from the claims and the entire specification. An aberration correcting apparatus, an optical pickup, and an aberration correcting method, which involve such changes, are also intended to be within the technical scope of the present invention.

INDUSTRIAL APPLICABILITY

The aberration correcting apparatus, the optical pickup, and the aberration correcting method according to the present invention can be applied to an aberration correcting apparatus which is used for an optical pickup for information recording or reading with respect to e.g. an optical disc, an optical pickup provided with the aberration correcting apparatus, and an aberration correcting method on the aberration correcting apparatus.

The invention claimed is:

1. An aberration correcting apparatus used for an optical pickup which can focus a first light beam for a first optical disc on the first optical disc and a second light beam for a second optical disc on the second optical disc by using an objective lens, said aberration correcting apparatus comprising:

a liquid crystal optical element which is disposed to cross a unified optical axis and which comprises a liquid crystal, the unified optical axis being obtained by matching an optical axis of the first light beam with an optical axis of the second light beam;

two electrode layers which are provided for said liquid crystal optical element and which face each other with the liquid crystal therebetween;

a first electrode which is formed in any one of said two electrode layers and which is located on a point P, if it is assumed that each of the electrode layers and the unified optical axis cross at the point P, a circle whose central point is the point P and whose diameter is substantially equal to an effective diameter D1 associated with the first optical disc is a circle C1, and a circle whose central point is the point P and whose diameter is substantially equal to an effective diameter D2 (D2<D1) associated with the second optical disc is a circle C2;

a plurality of second electrodes which are formed in any one of said two electrode layers and which are located so as to surround said first electrode;

a plurality of third electrodes which are formed in any one of said two electrode layers, which partially overlap a circumference of the circle C1 and a circumference of the circle C2, and which are arranged along the circumference of the circle C1 and the circumference of the circle C2;

a non-application area which is located between said first electrode and said third electrodes when each of said two electrode layers, which are superimposed, is observed in the unified optical axis, which is substantially annular, and which does not change a state of voltage application to the liquid crystal depending on voltage application to said first electrode and said third electrodes;

a first voltage application controlling device for controlling voltage application to said first electrode and said second electrodes in order to correct spherical aberration with regard to the first optical disc;

a second voltage application controlling device for controlling the voltage application to said third electrodes in order to correct astigmatism aberration with regard to the first optical disc; and a third voltage application controlling device for controlling voltage application to said first electrode and said third electrodes in order to correct spherical aberration with regard to the second optical disc.

2. The aberration correcting apparatus according to claim 1, wherein said third voltage application controlling device applies such a voltage that has a same polarity and same extent, to each of said third electrodes.

3. The aberration correcting apparatus according to claim 1, wherein said third voltage application controlling device controls the voltage application to said first electrode and said third electrodes so as to substantially match wavefront of the second light beam corresponding to said first electrode and wavefront of the second light beam corresponding to said third electrodes with wavefront of the second light beam corresponding to said non-application area.

4. The aberration correcting apparatus according to claim 1, wherein said first electrode is circular.

5. The aberration correcting apparatus according to claim 1, further comprising:

a plurality of fourth electrodes which are formed in any one or both of said two electrode layers and which are to correct coma aberration regarding the first optical disc or coma aberration regarding the second optical disc.

6. The aberration correcting apparatus according to claim 1, wherein the first optical disc is a DVD and the second optical disc is a CD.

7. An optical pickup comprising the aberration correcting apparatus according to claim 1.

8. A correction method of correcting spherical aberration with regard to a second optical disc on an aberration correcting apparatus used for an optical pickup which can focus a first light beam for a first optical disc on the first optical disc and a second light beam for the second optical disc on the second optical disc by using an objective lens, said aberration correcting apparatus comprising: (a) a liquid crystal optical element which is disposed to cross a unified optical axis and which comprises a liquid crystal, the unified optical axis being obtained by matching an optical axis of the first light beam with an optical axis of the second light beam; (b) two electrode layers which are provided for said liquid crystal optical element and which face each other with the liquid crystal therebetween; (c) a first electrode which is formed in any one of said two electrode layers and which is located on a point P, each of the electrode layers and the unified optical axis cross at the point P, a circle whose central point is the point P and whose diameter is substantially equal to an effective diameter D1 associated with the first Optical disc is a circle C1, and a circle whose central point is the point P and whose diameter is substantially equal to an effective diameter D2 (D2<D1) associated with the second optical disc is a circle C2; (d) a plurality of second electrodes which are formed in any one of said two electrode layers and which are located so as to surround said first electrode; (e) a plurality of third electrodes which are formed in any one of said two electrode layers, which partially overlap a circumference of the circle C1 and a circumference of the circle C2, and which are arranged along the circumference of the circle C1 and the circumference of the circle C2; and (f) a non-application area which is located between said first electrode and said third electrodes when each of said two electrode layers, which are superimposed, is observed in the unified optical axis, which is substantially annular, and which does not change a state of voltage application to the liquid crystal depending on voltage application to said first electrode and said third electrodes, said method comprising:

a first voltage applying process of applying a voltage to said first electrode so as to substantially match wavefront of the second light beam corresponding to said first electrode with wavefront of the second light beam corresponding to said non-application area; and a second voltage applying process of applying voltages to said third electrodes so as to substantially match wavefront of the second light beam corresponding to said third electrodes with wavefront of the second light beam corresponding to said non-application area.

9. The correction method according to claim 8, wherein the first optical disc is a DVD and the second optical disc is a CD.

* * * * *